(No Model.)
J. C. VETTER & S. G. PUTNAM.
ELECTRIC BATTERY.
No. 300,666. Patented June 17, 1884.
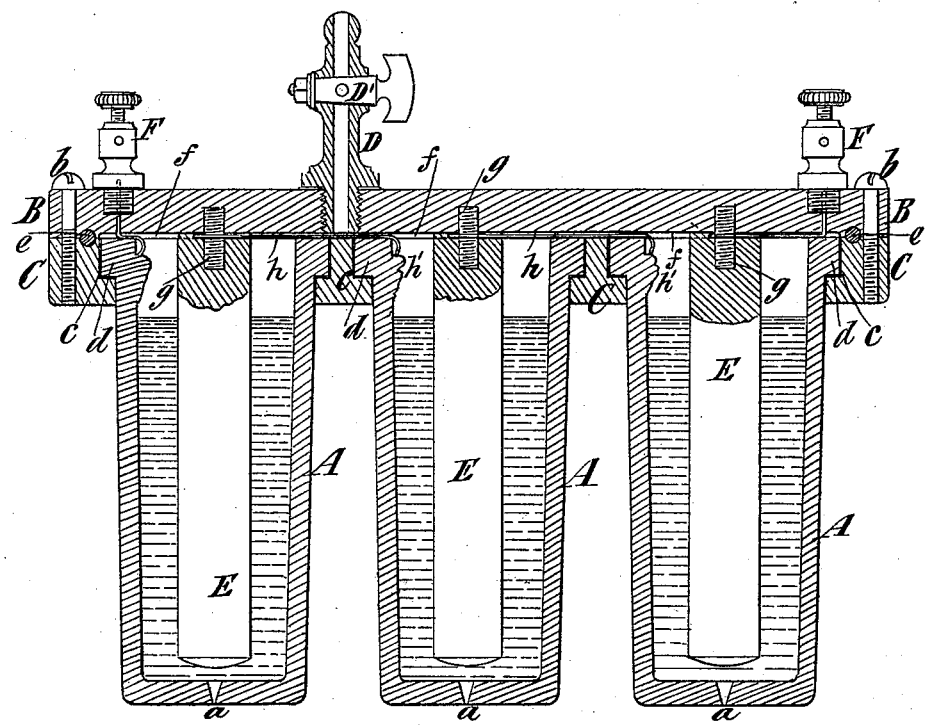
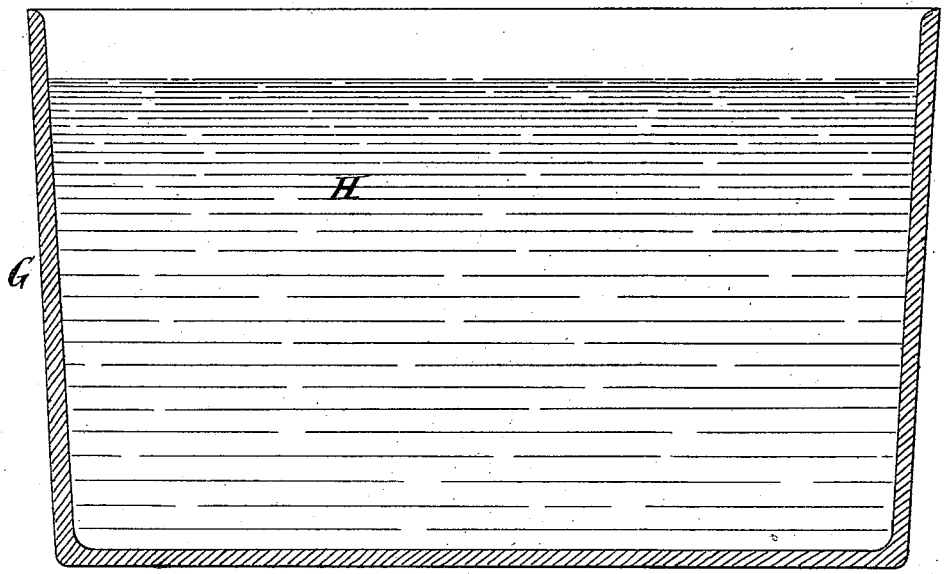
Witnesses
Ed. L. Moran
C. E. Sundgren
Inventor Joseph C. Vetter and
Stephen G. Putnam

UNITED STATES PATENT OFFICE.

JOSEPH C. VETTER AND STEPHEN G. PUTNAM, OF NEW YORK, N. Y.

ELECTRIC BATTERY.

SPECIFICATION forming part of Letters Patent No. 300,666, dated June 17, 1884.

Application filed September 7, 1883. (No model.)

*To all whom it may concern:*

Be it known that we, JOSEPH C. VETTER and STEPHEN G. PUTNAM, both of the city, county, and State of New York, have invented a new and useful Improvement in Electric Batteries, of which the following is a specification.

Our invention is applicable to batteries for medicinal and other purposes, and more particularly relates to batteries having a large number of small cups or cells, as its advantages will then be more apparent; but it may be embodied in batteries having any number of cells.

The object of our invention is to provide a simpler means than any heretofore known, whereby all the cups or cells, no matter what their number, may be filled or charged simultaneously and to insure a uniform height of liquid in all of them without the exercise of any special care.

To this end our invention consists, essentially, in the combination with a number of battery cups or cells, each provided with a valveless aperture in the lower portion of a head, wherein the cups or cells are secured and from which they depend, and which contains an air-tight chamber with which all the cups or cells are in communication, and a vent-tube leading from the air-tight chamber in the head, and provided with a cock or valve. When the cups or cells are to be charged, the cock or valve in the vent-tube is opened, and the cups or cells are all together immersed in the charging-liquid, whereupon the liquid enters through the apertures in the lower portions of the cells and rises to a uniform level in all the cells. The cock or valve is then closed and the cups or cells raised from the liquid and all the cups or cells retain their charge because the air-tight chamber has no vent, the cock or valve being closed, and air cannot enter thereinto to displace the liquid in the cups or cells.

The invention also consists in details of construction and combinations of parts hereinafter described and claimed.

The accompanying drawing is a vertical section of a battery embodying our invention, the cups or cells being removed from the charging-liquid.

In the example of our invention chosen for illustration, the cells or cups themselves are made of carbon, and each contains a zinc element; but our invention may be embodied in batteries wherein the cups or cells are of earthenware, or any other materials, each containing a carbon and a zinc element.

A designates the carbon cups or cells, only three of which are here shown. Each cup or cell has a valveless aperture, $a$, in its bottom, or at or near its lower end. These cups or cells are fixed in an air-tight manner at their upper ends in a head, here shown as consisting of two plates, B C, secured together by bolts or screws $b$. The lower of these plates C is formed with recesses $c$, which receive flanges $d$ on the cups or cells, and the cups or cells are cemented or otherwise secured in these recesses in an air-tight manner. Between the two plates B and C, near their edges, is secured a packing, $e$, whereby an air-tight joint is formed, and between the two plates is an air-tight chamber, $f$, with which the open tops of the cups or cells communicate.

D designates a vent-tube, which extends from the air-tight chamber $f$, between the plates B and C, and which is provided with a cock or valve, D'. When this cock or valve is opened, the chamber $f$ and the cells or cups A are in communication with the atmosphere; but when the cock or valve is closed, all communication with the atmosphere is cut off.

E designates the zinc elements, here shown as attached by screws $g$ to the plate B, and to these screws are attached connections $h$, which make contact with the carbon-cells at $h'$.

F designates the two binding-posts, one of which is connected with a cup or cell and the other with a zinc.

G designates the vat wherein is contained the charging-liquid H. When the cups or cells A are to be charged, the cock or valve D' is opened and the cups or cells are immersed in the liquid, which enters them freely to a uniform level in each through the apertures $a$. As here shown, the elements are connected to produce an intensity-current, but if a quantity-current be desired all the zinc elements would be connected together and all the carbon elements would be likewise connected in a manner well understood, and the cups or cells would be left in the liquid of the bath H, instead of being raised therefrom. When an intensity-current is desired, the cock or valve D' is closed, thus closing the chamber $f$, and the cups or cells air-tight, and the cups or cells are then lifted from the liquid. The apertures $a$ are of such small size and so formed that air cannot enter them, and the liquid is held in suspension in the cups or cells.

What we claim as our invention, and desire to secure by Letters Patent, is—

1. The combination, with a number of battery cups or cells, each having a valveless aperture in its lower portion, of a head wherein the cups are cells are secured and from which they depend, and which contains an air-tight chamber with which all the cups or cells are in communication, and a vent-tube leading from said air-tight chamber and provided with a cock or valve, substantially as and for the purpose described.

2. The combination of the plates B C, secured together in an air-tight manner, and having the air-tight chamber $f$ between them, the vent-tube and valve D D', and the cells or cups A, fixed in the plate C, and having each a valveless aperture, $a$, substantially as herein described.

J. C. VETTER.
S. G. PUTNAM.

Witnesses:
FREDK. HAYNES,
T. J. KEANE.